United States Patent [19]

Mueller et al.

[11] Patent Number: 4,914,713

[45] Date of Patent: Apr. 3, 1990

[54] ROTATION DETECTION OR SPEED PICKUP DEVICE FOR MINIATURE D-C MOTOR

[75] Inventors: Hans-Joachim Mueller; Werner Seuffert, both of Bergrheinfeld; Udo Winter, Kuernach, all of Fed. Rep. of Germany

[73] Assignee: Siemens Aktiengesellschaft, Berlin and Munich, Fed. Rep. of Germany

[21] Appl. No.: 242,794

[22] Filed: Sep. 9, 1988

[30] Foreign Application Priority Data

Sep. 11, 1987 [DE] Fed. Rep. of Germany ....... 3730607

[51] Int. Cl.$^4$ .................................................. G05B 5/00
[52] U.S. Cl. ................................... 388/805; 324/164; 310/68 B; 310/154; 388/912
[58] Field of Search ........... 310/68 B, 152–154, 310/155, 168, 181–187; 318/326, 327, 647, 652–653; 324/160, 164, 173–174; 388/803–805, 809–814

[56] References Cited

U.S. PATENT DOCUMENTS

| | | | |
|---|---|---|---|
| 3,466,477 | 4/1969 | Newill | 318/326 |
| 3,882,366 | 5/1975 | Clunis | 318/326 |
| 3,916,278 | 10/1975 | Curell et al. | 318/327 |
| 4,082,968 | 4/1978 | Jones | 310/68 B |
| 4,093,882 | 6/1978 | Furuta | 310/268 |
| 4,326,153 | 4/1982 | Contri | 318/327 |
| 4,766,359 | 8/1988 | Smith et al. | 318/326 |

FOREIGN PATENT DOCUMENTS 2039420 8/1980 United Kingdom .
2200501 8/1988 United Kingdom .

OTHER PUBLICATIONS

Patent Abstracts of Japan, Band 10, Nr. 213 (E-422) [2269], 25, Jul. 1986; and JP-A-61 52 126 (Matsushita) Electric Ind. Co. Ltd) 14.03, 1986, * Die Ganze Zusammenfassung*.

Patent Abstracts of Japan, Band 9, Nr. 295 (E-360) [2018], Denko K.K.) 18.07.1985, *Die ganze Zusammenfassung*.

*Primary Examiner*—William M. Shoop, Jr.
*Assistant Examiner*—David Martin
*Attorney, Agent, or Firm*—Kenyon & Kenyon

[57] ABSTRACT

In order to pick up in a simple manner which is reliable, and under rough operating conditions, a rotation of the rotor in a miniature motor excited by permanent magnets with magnet segments at a tangential distance with magnet segments distributed at the bore circumference of the stator, it is proposed to arrange in at least one pole gap between the magnet segment a measuring coil. A signal is induced by the pulsation of the stray field due to rotation of the rotor. The measuring coil is advantageously arranged in a non-magnetic, preferably plastic support body held between the individual poles or the magnet segments respectively.

9 Claims, 1 Drawing Sheet

U.S. Patent
Apr. 3, 1990
4,914,713
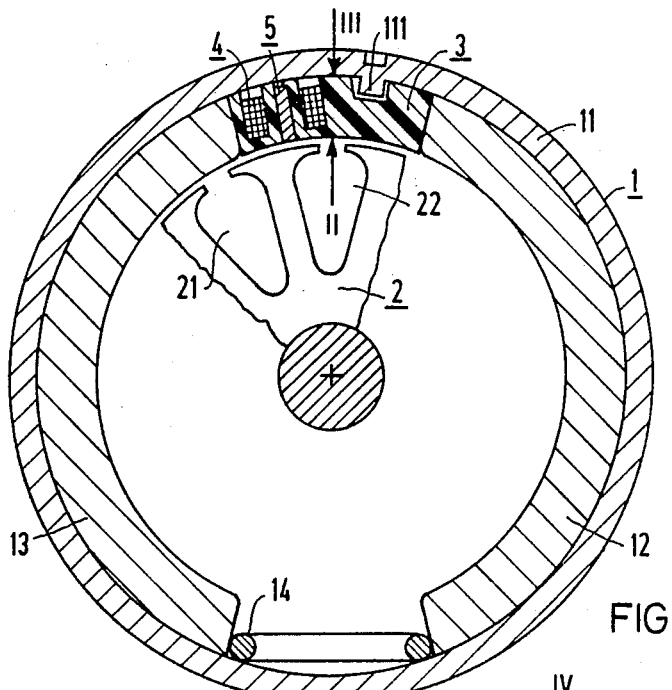
FIG 1
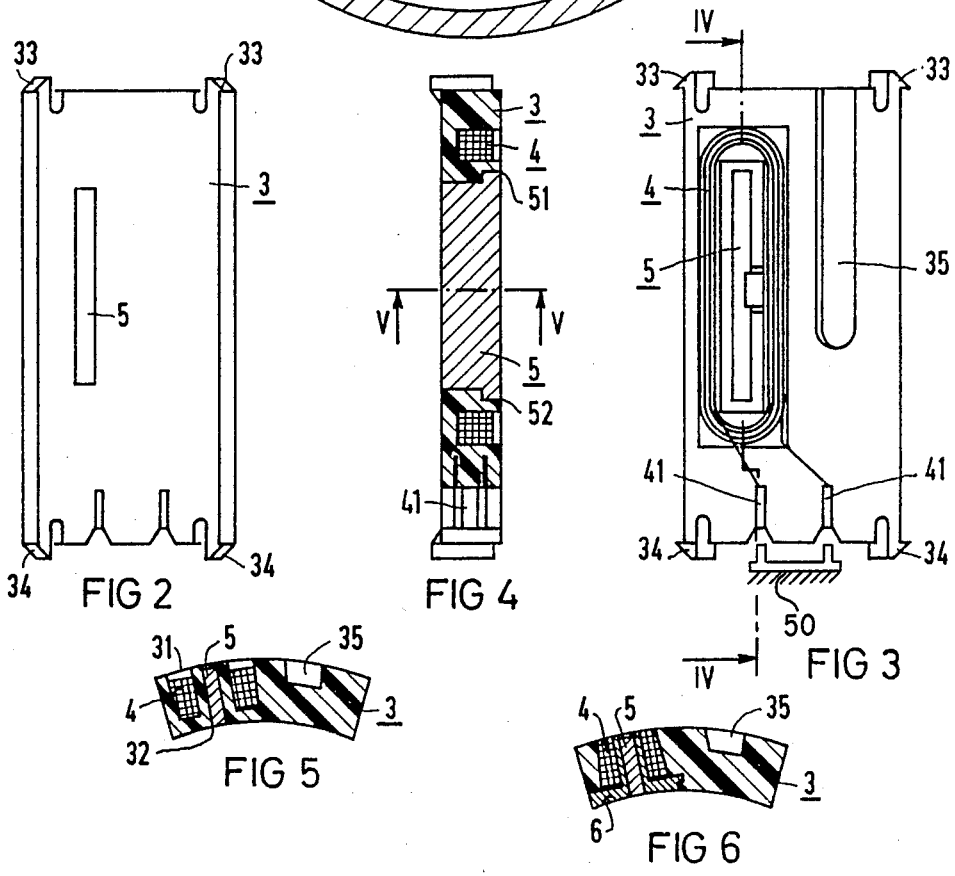
FIG 2  FIG 4  FIG 3
FIG 5  FIG 6 ature d-c motor excited by permanent magnets constructed in accordance with this invention;

ROTATION DETECTION OR SPEED PICKUP DEVICE FOR MINIATURE D-C MOTOR

BACKGROUND OF THE INVENTION

The invention relates to a rotation detection speed pickup device for a miniature d-c motor excited electrically or by permanent magnets.

DESCRIPTION OF THE PRIOR ART

A miniature d-c motor is excited by permanent magnets is described, for instance, from DE-OS 35 29 483.

OBJECTIVES AND SUMMARY OF THE INVENTION

According to the object of the present invention, the rotation of the rotor and, optionally, its instantaneous speed of rotation or the prevailing angle of rotation is to be determined in a simple manner which is reliable even under rough operating conditions.

A further objective is to provide signal indicative of said rotor speed of rotation, which signal can be fed to a subsequent evaluation and/or control circuit.

The invention makes use of the principle according to which the stray field in the pole gaps between the individual poles or magnet segments exhibits a pulsation at the slot frequency in the radially directed magnetic field induced as the rotor rotates. By using this principle, a rotation detection and/or speed pickup device can be constructed according to the invention without degradation of the motor operation and, in particular, without changing the overall size of the motor. This device is largely insensitive to rough operating conditions such as shock or stress.

According to one embodiment of the invention, a particularly effective and shock-proof measuring coil is provided which is arranged in a non-magnetic support body held between the individual poles and the magnet segments. A plastic body which can be pushed in and-/or clamped firmly between the opposite tangential end faces of two adjacent magnet segments is found to be especially effective.

An additional bracing between the plastic support body and the magnet segments can be achieved by means of detent snap hooks on the end side of the body which snap-in in front of the axial end faces of the magnet segments when the operating position of the plastic support body is reached. Circumferential alignment of the plastic support body is achieved, according to one embodiment of the invention, by particularly simple means wherein the support body is provided with at least one axial guiding slot which engages at least one corresponding axial guiding dog of the motor housing. The guide dog is pressed during the production of the motor housing from the outside of an axially extending depression.

According to one embodiment of the invention, electrical contact between the measuring coil and a speed evaluation or speed control circuit can be achieved in a simple manner by the provision that in the support body, measuring coil terminals are held in the support body for connection to an external lead. The inner ends of the terminals are connected to the measuring coil.

Advantageously the measuring coil leads are designed as plug-in connectors which are arranged to form a contact during the assembly of the miniature d-c motor on the commutator side of a corresponding brush assembly plug-in terminals.

BRIEF DESCRIPTION OF THE FIGURE

The invention as well as further advantageous embodiments of the invention will be explained in greater detail in the following, and referring to a schematic embodiment of the invention shown in the drawings, wherein FIG. 1 shows a radial cross section through a miniature d-c motor excited by permanent magnets constructed in accordance with this invention;

FIG. 2 shows a bottom view of the plastic support body in direction II in FIG. 1;

FIG. 3 shows a top view of the plastic support body in the direction III in FIG. 1;

FIG. 4 shows an axial longitudinal section through the support body taken along line IV—IV in FIG. 3;

FIG. 5 shows a sectional view of the plastic support body according to FIG. 4 in the section V—V; and FIG. 6, shows an alternative design of the plastic support body with a measuring coil arrangement.

DETAILED DESCRIPTION OF THE INVENTION

FIG. 1 shows a miniature d-c motor excited by permanent magnets with two magnet segments 12, 13, arranged at a circumferential distance on the inside cylindrical surface of a stator housing 1 and with a rotor 2 which is shown here without the windings. The rotor is provided with radial slots around its circumference such as two slots 21, 22 for housing the rotor windings.

The magnet segments 12, 13 are pressed against the inside circumference surface of the housing 1 by means of a spring washer 14 which is pushed between the two opposite lower tangential ends of the magnet segments 12, 13 as shown. Between the two opposite or upper tangential ends of the magnet segments 12, 13 between there is plastic support body 3 receiving a measuring coil 4 and an induction iron core 5 around which the coil is formed.

The arrangement of the measuring coil 4 and its connection to two external plug-in terminals 41, 41 can be seen in FIGS. 2 to 6. In the embodiment of FIGS. 1 to 5, the measuring coil 4 is placed in a measuring coil slot 31 (FIG. 5) from the top side of the plastic support body 3. The coil is provided as a prefabricated coil wrapped within the plastic support body 3. From the underside of the plastic support body 3, an induction iron core 5 is pushed which snaps in or which is mounted or secured by detent projections 51, 52 in corresponding detent depressions formed on the plastic support body 3. The winding terminals of the coil 4 are terminated by measuring coil terminals 41, 41 in the form of plug contacts. The plastic support body 3 is integrally cast with plug sleeves in the region of the measuring coil terminals 41, 41 which receives, for instance, mating jacks 50 incorporated into the brush assembly of the miniature d-c motor in such a manner that during the assembly of the miniature d-c motors the plug contacts of the measuring coil leads are automatically connected to the mating jacks.

FIG. 6 shows alternate embodiment wherein the measuring coil 4 placed or wrapped in the measuring coil slot 31 of the plastic support body 3, is prefabricated on a T-shaped mandrel 6 which can then be inserted as a unitary component into a corresponding opening of the plastic support body 3 and secured thereto its operating position.

For axial guidance and form-fitting tangential mounting, the plastic support body 3 is provided with an axial guiding slot 35 which is open to the front end. Similarly, housing 1, has a corresponding axial guiding dog 111 embossed radially inward, which engages support body 3 upon axial movement thereof, between the pole gap between the two tangential end, of the magnet segments 12, 13. Additional form-fitting axial bracing between the magnet segments 12, 13 and the plastic support body 3 in its operating position is provided according to one embodiment of the invention, by means of cast detent snap-in, or interface fit hooks 33, 33 and 34, 34, respectively, which overlap the axial end faces of the magnet segments 12, 13.

The pulsation of the magnetic field between tangential ends of magnets 12, 13, induces an A.C. electrical signal in coil 4 having a frequency indicative of the rotational speed of the rotor 2.

What is claimed is:

1. A rotation detection or speed pick-up device for a miniature d-c motor excited by a permanent magnet with magnet segments distributed over the inner circumference of the stator housing, said magnet segments being separated by pole gaps, and with a rotor which is slotted or serrated over its circumference, the device comprising:
   an axially insertable non magnetic plastic support body held between the individual poles of the permanent magnet segments within the stator housing; and
   a measuring coil coupled to said support body and disposed in one of said pole gaps for generating a signal induced by pulsation of the stray field when the rotor rotates and having a frequency corresponding to the speed of the rotor.

2. The rotation detection device according to claim 1, further comprising an induction iron core surrounded by said measuring coil, said coil extending circumferentially along a distance smaller than the slot width of the slotted rotor.

3. The rotation detection according to claim 1, wherein the measuring coil and the iron core are plugged into pockets of the plastic support body and are held by a detent lock.

4. The rotation detection device according to claim 1 wherein the measuring coil has measuring coil terminals (41, 41) connected to the ends of the measuring coil, said coil terminals being held in the plastic support body for connection to an external connection line.

5. The rotation detection device according to claim 4, wherein the measuring coil terminals can be connected to jack contacts in the assembly of the miniature d-c motor with corresponding brush bridge mating contacts on the commutator side.

6. The rotation detection device according to claim 1 wherein the plastic support body is provided with at least one axial guide slot and the motor housing has least one corresponding axial guide dog whereby the guide dog is disposed in said guide slot.

7. The rotation detection according to claim 1 wherein the plastic support body is clamped between opposite tangential ends of two adjacent magnet segments.

8. The rotation detection device according to claim 7, wherein the plastic support body is secured by means of detent snap hooks to the axial ends of the adjacent magnet segments.

9. A rotation detection device for a miniature d-c motor excited electrically by individual exciter poles distributed over the inner circumference of a stator housing, separated by pole gaps, and with a rotor which is slotted or serrated over its circumference, the device comprising:
   an axially insertable non-magnetic plastic support body which is held within one of said pole gaps between said individual exciter poles within the stator housing; and
   a measuring coil, located on said support body, which generates a signal induced by a slot frequency pulsation of the stray field within the gap when the rotor rotates.

* * * * *